US012786523B2

(12) United States Patent
Yan

(10) Patent No.: US 12,786,523 B2
(45) Date of Patent: Nov. 3, 2026

(54) EFFECT DISPLAY METHOD, COMPUTER DEVICE, AND STORAGE MEDIUM

(71) Applicant: Beijing Zitiao Network Technology Co., Ltd., Beijing (CN)

(72) Inventor: Kai Yan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 128 days.

(21) Appl. No.: 18/819,787

(22) Filed: Aug. 29, 2024

(65) Prior Publication Data

US 2025/0080809 A1 Mar. 6, 2025

(30) Foreign Application Priority Data

Aug. 31, 2023 (CN) .......................... 202311117884.4

(51) Int. Cl.
*H04N 21/81* (2011.01)
*G06V 10/96* (2022.01)
*G06V 20/40* (2022.01)

(52) U.S. Cl.
CPC ......... *H04N 21/8146* (2013.01); *G06V 10/96* (2022.01); *G06V 20/41* (2022.01); *G06V 2201/07* (2022.01)

(58) Field of Classification Search
CPC ........... H04N 21/8146; H04N 21/2187; H04N 21/23418; H04N 21/44008; H04N 21/4312; H04N 21/435; H04N 21/816; G06V 10/96; G06V 20/41; G06V 2201/07; G06V 20/46
See application file for complete search history.

(56) References Cited

U.S. PATENT DOCUMENTS 9,466,221 B2 * 10/2016 Jackson .................... G09B 5/10
12,568,303 B2 * 3/2026 Zhang .................. H04N 23/632
(Continued)

FOREIGN PATENT DOCUMENTS

CN 110536151 A * 12/2019 ......... H04N 21/2187
CN 116309988 A 6/2023

OTHER PUBLICATIONS

Zhang, H., Cao, X., Ho, J. K., & Chow, T. W. (2016). Object-level video advertising: an optimization framework. IEEE Transactions on industrial informatics, 13(2), 520-531.*
(Continued)

*Primary Examiner* — Sarah Lhymn
(74) *Attorney, Agent, or Firm* — BakerHostetler

(57) ABSTRACT

The present disclosure provides an effect display method and apparatus, a computer device, and a storage medium, and the method includes: acquiring a video frame image to be processed, in which the video frame image includes an image including at least one target object acquired during live streaming; determining, based on position information corresponding to the target object in the video frame image, a display position corresponding to a target effect matching the target object, in which the position information corresponding to the target object in the video frame image is determined based on historical position information corresponding to the target object in a plurality of frames of historical frame images; and displaying, based on the display position, the target effect matching each target object in the video frame image.

15 Claims, 3 Drawing Sheets

(56) References Cited

U.S. PATENT DOCUMENTS

| | | | | |
|---|---|---|---|---|
| 2018/0108165 | A1* | 4/2018 | Shi | G06T 11/60 |
| 2022/0237916 | A1* | 7/2022 | Xiao | G06V 20/46 |
| 2022/0261962 | A1* | 8/2022 | Duval | G06T 3/4069 |
| 2023/0343345 | A1* | 10/2023 | Tang | G10L 19/005 |
| 2024/0080529 | A1* | 3/2024 | Leroux | H04N 21/431 |
| 2025/0390984 | A1* | 12/2025 | Ma | G06T 3/4038 |

OTHER PUBLICATIONS

Chen, X., Nguyen, T. V., Shen, Z., & Kankanhalli, M. (Oct. 2019). Livesense: Contextual advertising in live streaming videos. In Proceedings of the 27th ACM international conference on multimedia (pp. 392-400).*

Szeto, R., Sun, X., Lu, K., & Corso, J. J. (2019). A temporally-aware interpolation network for video frame inpainting. IEEE transactions on pattern analysis and machine intelligence, 42(5), 1053-1068.*

* cited by examiner

EFFECT DISPLAY METHOD, COMPUTER DEVICE, AND STORAGE MEDIUM

CROSS-REFERENCE TO RELATED APPLICATION

The present application claims the priority to Chinese Patent Application No. 202311117884.4, filed on Aug. 31, 2023, the entire disclosure of which is incorporated herein by reference as portion of the present application.

TECHNICAL FIELD

The present disclosure relates to an effect display method and apparatus, a computer device, and a storage medium.

BACKGROUND

In a live streaming scenario, a user can capture a video while performing a live video streaming synchronously. In order to increase the interest of the live streaming, it is possible to add effects in a displayed video frame image, such as adding head dresses for the user in the video frame image. In the video, the user's position is not fixed. In order to locate the position where the effects will be added, the position of the user in the video will be determined by an algorithm frame by frame, but this approach will consume more computing power and has a slower processing speed, and is prone to live streaming lag.

SUMMARY

Embodiments of the present disclosure provide an effect display method and apparatus, a computer device, and a storage medium.

In a first aspect, the embodiments of the present disclosure provide an effect display method, including: acquiring a video frame image to be processed, in which the video frame image includes an image including at least one target object acquired during live streaming; determining, based on position information corresponding to the target object in the video frame image, a display position corresponding to a target effect matching the target object, in which the position information corresponding to the target object in the video frame image is determined based on historical position information corresponding to the target object in a plurality of frames of historical frame images; and displaying, based on the display position, the target effect matching each target object in the video frame image.

In an optional embodiment, determining the position information corresponding to the target object in the video frame image includes: determining whether the video frame image satisfies a preset verification condition based on the historical position information determined for the target object consecutively over several times; in response to the video frame image not satisfying the preset verification condition, performing interpolation prediction on the video frame image using a prediction model to obtain the position information corresponding to the target object in the video frame image, in which the prediction model is obtained by fitting based on the historical position information determined consecutively; and in response to the video frame image satisfying the preset verification condition, performing object recognition on the video frame image to obtain the position information corresponding to the target object in the video frame image.

In an optional embodiment, whether determining the video frame image satisfies the preset verification condition includes: determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

In an optional embodiment, determining the preset frame number threshold includes: determining a scenario type of a live streaming scenario corresponding to the video frame image; and determining, based on the scenario type of the live streaming scenario, the preset frame number threshold, in which different preset frame number thresholds are set for different scenario types.

In an optional embodiment, the determining the scenario type of the live streaming scenario corresponding to the video frame image includes at least one of: (i) performing behavior recognition on the target object in the video frame image to determine the scenario type of the live streaming scenario corresponding to the video frame image, based on a behavior recognition result of the target object; (ii) determining a model type corresponding to the prediction model used for the interpolation prediction on the video frame image, and determining the scenario type of the live streaming scenario corresponding to the video frame image based on the model type.

In an optional embodiment, the video frame image further includes a lost frame image detected during the live streaming, and the method further includes: acquiring a live streaming background image displayed in the video frame image from the plurality of frames of historical frame images of the video frame image; and cropping, based on the position information determined for the target object, an object map corresponding to the target object from a previous frame of historical frame image of the video frame image, and synthesizing, based on the determined position information, the object map into the live streaming background image to obtain a completed lost frame image.

In a second aspect, the embodiments of the present disclosure further provide an effect display apparatus, including: an acquisition module, configured to acquire a video frame image to be processed, in which the video frame image includes an image including at least one target object acquired during live streaming; a determination module, configured to determine, based on position information corresponding to the target object in the video frame image, a display position corresponding to a target effect matching the target object, in which the position information corresponding to the target object in the video frame image is determined based on historical position information corresponding to the target object in a plurality of frames of historical frame images; and a display module, configured to display, based on the display position, the target effect matching each target object in the video frame image.

In an optional embodiment, determining the position information corresponding to the target object in the video frame image includes: determining whether the video frame image satisfies a preset verification condition based on the historical position information determined for the target object consecutively over several times; in response to the video frame image not satisfying the preset verification condition, performing interpolation prediction on the video frame image using a prediction model to obtain the position information corresponding to the target object in the video frame image, in which the prediction model is obtained by fitting based on the historical position information determined consecutively; and in response to the video frame image satisfying the preset verification condition, performing object recognition on the video frame image to obtain the position information corresponding to the target object in the video frame image.

In an optional embodiment, determining whether the video frame image satisfies the preset verification condition includes: determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

In an optional embodiment, determining the preset frame number threshold includes: determining a scenario type of a live streaming scenario corresponding to the video frame image; and determining, based on the scenario type of the live streaming scenario, the preset frame number threshold, in which different preset frame number thresholds are set for different scenario types.

In an optional embodiment, the effect display apparatus further includes a first processing module, which is configured to determine the scenario type of the live streaming scenario corresponding to the video frame image, and is specifically configured to perform at least one of: (i) performing behavior recognition on the target object in the video frame image to determine the scenario type of the live streaming scenario corresponding to the video frame image, based on a behavior recognition result of the target object; (ii) determining a model type corresponding to the prediction model used for the interpolation prediction on the video frame image, and determining the scenario type of the live streaming scenario corresponding to the video frame image based on the model type.

In an optional embodiment, the video frame image further includes a lost frame image detected during the live streaming, and the effect display apparatus further includes a second processing module, which is configured to: acquire a live streaming background image displayed in the video frame image from the plurality of frames of historical frame images of the video frame image; and crop, based on the position information determined for the target object, an object map corresponding to the target object from a previous frame of historical frame image of the video frame image, and synthesize, based on the determined position information, the object map into the live streaming background image to obtain a completed lost frame image.

In a third aspect, the embodiments of the present disclosure further provide a computer device, including a processor and a memory; the memory stores machine-readable instructions executable by the processor, the processor is configured to execute the machine-readable instructions stored in the memory, and when the machine-readable instructions are executed by the processor, the processor performs the above-mentioned first aspect or any one of the embodiments in the first aspect.

In a fourth aspect, the embodiments of the present disclosure further provide a non-transitory computer-readable storage medium, storing a computer program, and when the computer program is executed by a computer device, the computer device performs the above-mentioned first aspect or any one of the embodiments in the first aspect.

BRIEF DESCRIPTION OF DRAWINGS

In order to more clearly illustrate the technical solutions of the embodiments of the present disclosure, the drawings required for the embodiments are briefly described below. These drawings are incorporated into and constitute a part of the present disclosure. These drawings illustrate embodiments that comply with the present disclosure and, together with the detailed description, serve to explain the technical solutions of the present disclosure. It should be understood that the following drawings only show some embodiments of the present disclosure and therefore should not be considered as limiting its scope. For those skilled in the art, other related drawings may also be obtained based on these drawings without any creative effort.

DETAILED DESCRIPTION

Figure 1:
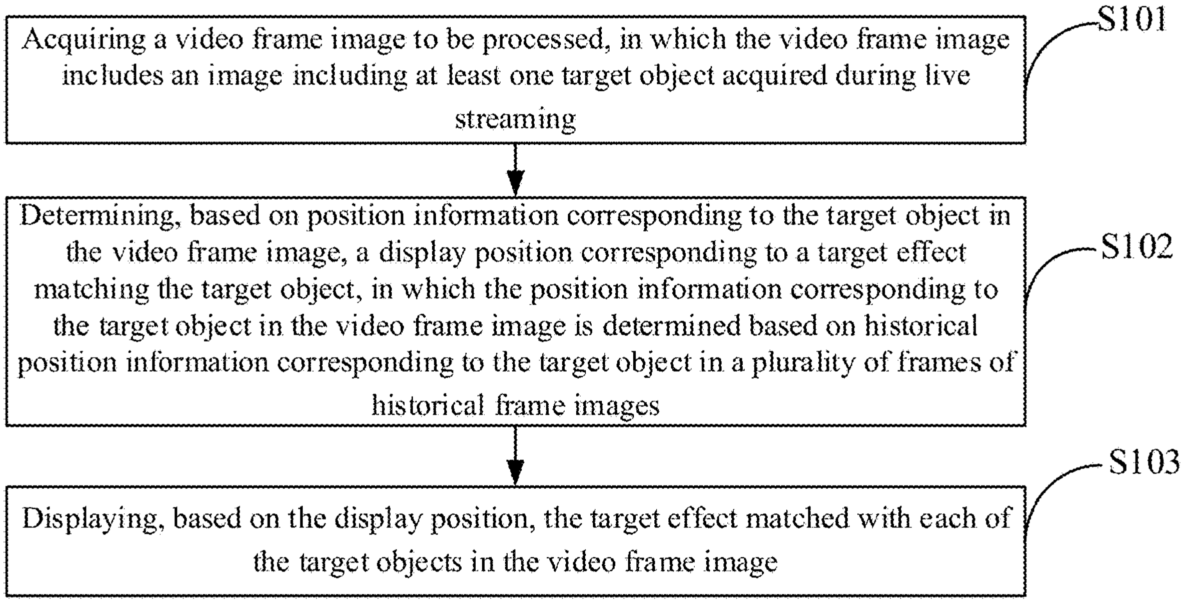
FIG. 1 illustrates a flowchart of an effect display method according to the embodiments of the present disclosure.

In order to make the objectives, technical solutions, and advantages of the embodiments of the present disclosure clearer, the technical solutions in the embodiments of the present disclosure will be described clearly and completely below in conjunction with the drawings. Apparently, the described embodiments are just a part but not all of the embodiments of the present disclosure. The components of the embodiments of the present disclosure typically described and illustrated herein can be arranged and designed in a variety of different configurations. Therefore, the detailed description of the embodiments of the present disclosure provided below is not intended to limit the scope of the present disclosure as claimed, but merely represents selected embodiments of the present disclosure. All other embodiments obtained by those skilled in the art without any creative effort based on the embodiments of the present disclosure fall within the scope of the present disclosure.

It has been found that in a live streaming scenario, a user may have the option to add effects during live video streaming to increase interest of the live streaming. In some cases, the added effects are specifically associated with the user, for example, the effects refer to head dresses displayed on the user's head. In order to locate where the effects are added, the user's position in the video may be located using an algorithm frame by frame. However, in the live streaming scenario, new video frame images will be generated continuously, and it is necessary to react quickly to add effects to the video frame images, to meet the real-time requirements for the live streaming. The approach of using an algorithm to locate the user's position frame by frame will consume more computing power and has a slower processing speed, and is prone to live streaming lag.

Based on the above-mentioned research, the present disclosure provides an effect display method. For an acquired video frame image to be processed, the corresponding position information for a target object in the video frame image may be determined by prediction according to historical position information corresponding to the target object in a plurality of frames of historical frame images, respectively, so that the consumption of computing power caused by continually using an algorithm to locate the position information may be avoided and the processing speed may be increased, to avoid live streaming lag.

The defects of the above-mentioned solutions are the result of the inventor's practice and careful study, and therefore, the process of discovering the above-mentioned problems and the solutions proposed in the present disclosure below to address the above-mentioned problems should be the inventor's contribution to the present disclosure in the course of the present disclosure.

It should be noted that similar numerals and letters denote similar items in the drawings, and therefore, once an item is defined in a figure, it does not need to be further defined or explained in the subsequent figures.

In order to facilitate the understanding of the present disclosure, an effect display method disclosed in the embodiments of the present disclosure is first described in detail. The effect display method provided in the embodiments of the present disclosure is generally executed by a computer device having certain computing power. The computer device includes, for example, a terminal device or a server or other processing devices, and the terminal device may be UE (User Equipment), a mobile device, a user terminal, a terminal, a cellular phone, a cordless phone, a PDA (Personal Digital Assistant), a handheld device, a computing device, an in-vehicle device, a wearable device, and the like. In some possible implementations, the effect display method may be implemented by a processor calling computer-readable instructions stored in a memory.

The effect display method provided in the embodiments of the present disclosure is described below. The effect display method provided in the embodiments of the present disclosure may be applied in a platform having a live video streaming function, such as a video playing platform, a shopping platform, and the like. During live video streaming, there may be one or more people in the captured video, and the displayed people may be all or some of them may be selected as target objects to be added with effects as illustrated in the embodiments of the present disclosure, and the target objects may also include other objects such as pets or the like. In the process of adding an effect for a selected target object, the position where the effect to be added is determined according to the position information of the target object in the video frame image in the embodiments of the present disclosure. For example, the effect may correspond to a hair accessory type, which is associated to be displayed in a head region of the user; or it may also be a prop type, which is associated to be displayed in a hand region of the user. Thus, the target object may also be refined to a certain part, such as the head or the hand as illustrated in the above-mentioned example.

Referring to FIG. 1, a flowchart of an effect display method according to the embodiments of the present disclosure is illustrated. The method includes steps S101-S103.

S101: acquiring a video frame image to be processed, in which the video frame image includes an image including at least one target object acquired during live streaming.

S102: determining, based on position information corresponding to the target object in the video frame image, a display position corresponding to a target effect matching the target object, in which the position information corresponding to the target object in the video frame image is determined based on historical position information corresponding to the target object in a plurality of frames of historical frame images.

S103: displaying, based on the display position, the target effect matched with each of the target objects in the video frame image.

With respect to the step S101, the video frame image to be processed is first described. In a live streaming scenario, video frame images will be continuously generated in the continuous video recording. In an optional case, because the effects are displayed specifically for target objects listed in the above-mentioned example, the video frame image to be processed includes at least one target object, such as a character, an animal, or a certain part.

Further, in response to displaying a target effect, a video frame image acquired in a certain time period may be selected as the video frame image to be processed according to a setting of the user. For example, at least one optional effect selection button may be provided to the user, and in response to a selection triggering operation on the effect selection button by the user, the video frame image acquired later may be used as the video frame image to be processed.

With respect to the step S102, for the video frame image to be processed, the display position corresponding to a matching target effect is determined for the target object in the video frame image specifically, based on the position information corresponding to the target object in the video frame image.

In an optional case, a pre-trained object recognition algorithm may be used to determine, frame by frame, the position information corresponding to the target object in each video frame image. However, in this case, the number of consecutively acquired video frame images in the live streaming is large, and there is a real-time requirement in the live streaming, and accordingly, in response to image processing by an algorithm, it is easy to cause playback lag in the live streaming because it needs to take some time to process through the algorithm.

Therefore, in the embodiments of the present disclosure, the position information corresponding to the target object in the video frame image is determined utilizing the historical position information corresponding to the target object in the plurality of frames of historical frame images, respectively. Here, the selected plurality of frames of historical frame images may include historical frame images acquired in a period of time before the current moment. That is, the selected plurality of frames of historical frame images are generated before the current moment, and are generated at a time adjacent to the current moment.

In the embodiments of the present disclosure, in order to reduce the use of the algorithm to determine the position information corresponding to the target object in the video frame image, interpolation prediction is used, i.e., the position information corresponding to the target object in the video frame image acquired currently is predicted utilizing the historical position information corresponding to the target object in the plurality of frames of historical frame images.

Here, by utilizing the historical position information corresponding to the target object in the plurality of frames of historical frame images, a trend of change corresponding to the position of the target object may be determined to predict the position information corresponding to the target object in the video frame image acquired currently. Illustratively, the target object is under the action of walking, and according to changes of the position information of the target object under the action of walking in the plurality of frames of historical frame images, such as the position information indicating walking to the right at a uniform speed, the position information corresponding to the target object in the video frame image acquired currently may be predicted.

In the above process, a model that can express such as being in the state of walking to the right at a uniform speed under the position information is, for example, a prediction model, and the prediction model is obtained by fitting based on the historical position information determined consecutively.

The method of determining the prediction model is described below by way of examples. The prediction model may be expressed in the form of a function. The function that may be selected includes, but is not limited to, a linear function, a quadratic function, an exponential function, and the like. There may be only one prediction model selected during the live streaming, or different prediction models may be selected in different time periods of the live streaming.

Taking the exponential function as an example, the general formula for the prediction model may be expressed in the following form:

$$y = a \cdot e^{bx},$$

where y represents the predicted position information, which may be denoted as a coordinate value in the video frame image; x represents a variable, which may be a time, such as an interval time between two consecutive video frame images, and the interval time illustrated herein may be determined according to a sampling frame rate of the video frame image during the live streaming. a and b are both parameters, where a represents the initial or reference value in response to x=0, such as the position information of the target object in the first frame of video frame image; and b represents the growth rate of the predicted position information.

On the basis of the general model described above, different difference predictions may be performed according to different value types. For example, the value types may include a floating-point type, a quaternion type, a vector type, or the like. Illustratively, in response to the floating-point type being selected, the above general formula may be refined into the form of a function in the floating-point type as below:

$$y = finalValue + (lastValue - finalValue) \times \exp(\text{damp} \times antiDampFactor \times deltaTime).$$

Here, to simplify the formula, exp(·) represents the power operation of the natural exponent (e), where Time represents the time corresponding to the current moment, which may be denoted in terms of the number of frames; lastValue represents the position information corresponding to the previous frame of historical frame image adjacent to the current frame; finalValue represents the currently selected reference value; damp represents a damping coefficient, in which the value may be adjusted to change an exponential increment; deltaTime represents an interval time between two consecutive frames of video frame images; antiDampFactor is an anti-damping coefficient, which may be used with the damping coefficient damp together to adjust the increment of the exponential function.

After the prediction model is acquired, the video frame image may be subjected to interpolation prediction by means of the prediction model, to obtain the position information of the target object in the video frame image. For example, the prediction model may be a function model such as an exponential model, so it requires less consumption of computing power and is faster in data processing than the above approach of using an algorithm, and accordingly is better adapted to the needs of fast computing and processing in the live streaming scenario.

However, in response to performing the interpolation prediction by means of the prediction model continuously, the interpolation prediction is a prediction that may be performed only according to a rule of change corresponding to the position information of the target object. This rule of change is limited to a short period of time, for example, if a forward movement of the target object is reflected in consecutive 5 frames, then during the interpolation prediction via the prediction model, the position information of the target object under prediction may be determined in the following 2 or 3 frames based on the rule of change in position of the target object due to the forward movement. However, after a longer period of time, because the action of the target object may change, it is not possible to choose the rule of change acquired under the previous action to continue the prediction to determine the position information corresponding to a next frame of video frame image.

In an implementation, in response to determining whether to select to use the prediction module to predict the position information for each frame of video frame image by synchronously determining the change in action of the target object, additional computing power will be consumed. Therefore, in the embodiments of the present disclosure, the approach of setting the preset verification condition is selected to determine to use the prediction model to perform the interpolation prediction to obtain the position information for the acquired video frame image to be processed, or the approach of object recognition, e.g., the algorithm illustrated above, is selected to obtain the position information.

For example, the position information corresponding to the target object in the video frame image may be determined by the following ways: determining whether the video frame image satisfies a preset verification condition based on the historical position information determined for the target object consecutively over several times; in response to the video frame image not satisfying the preset verification condition, performing interpolation prediction on the video frame image using a prediction model to obtain the position information corresponding to the target object in the video frame image, the prediction model being obtained by fitting based on the historical position information determined consecutively; and in response to the video frame image satisfying the preset verification condition, performing object recognition on the video frame image to obtain the position information corresponding to the target object in the video frame image.

Here, the preset verification condition is first described. The preset verification condition is a judgment condition for determining the selection of interpolation prediction or object recognition, and is used for timely correcting and checking the continuously predicted position information by the object recognition when the position information corresponding to the target object is predicted by the interpolation prediction consecutively, thereby avoiding the problem that the predicted position information is inaccurate in the video frame image acquired subsequently in response to predicting the position information by the interpolation prediction for a long period of time.

The preset verification condition may be determined based on the preset frame number threshold. For example, after it is determined that the position information corresponding to the target object in a video frame image is obtained by the object recognition, the position information may be determined by the interpolation prediction in video frame images acquired in the subsequent 4 or 5 frames, but the position information is corrected and checked by the object recognition after an interval of 4 or 5 frames. Thus, the preset verification condition may include the preset frame number threshold, i.e., the maximum interval frame number, between two object recognitions performed consecutively.

Therefore, in an implementation, the following ways are used to determine whether the video frame image satisfies the preset verification condition: determining a target historical frame image for which the historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

For example, the preset frame number threshold is set to 5 frames. After the current video frame image to be processed is acquired, a historical frame image for which the historical position information is determined by the object recognition the last time may be determined as the target historical frame image, and it may be determined whether the interval frame number between the target historical frame image and the current video frame image to be processed exceeds 5 frames. If it exceeds, it is determined that the preset verification condition is satisfied, and the object recognition is used to acquire the accurate position information, to correct and check the prediction model for the subsequent use. If it is not exceeded, the position information may be acquired quickly by continuing to use the prediction model to perform the interpolation prediction, thereby meeting the demand for adding effects in the live streaming scenario.

Here, in the process of determining the preset frame number threshold, the refinement may further be made according to different live streaming scenarios. For example, for a live streaming scenario of the type of shared study room, in which a student who is studying as the target object may be expected to remain in a sitting state for a relatively long period of time, the preset frame number threshold may be set to a large frame number, such as 10 frames. As for a live streaming scenario such as a sports live streaming, in which a user who is doing exercises as the target object may be expected to have more positional changes during the exercise process, a small frame number, such as 3 frames, is set to make correction in time.

Therefore, in an implementation, the preset frame number threshold may be determined by the following ways: determining a scenario type of a live streaming scenario corresponding to the video frame image; and determining, based on the scenario type of the live streaming scenario, the preset frame number threshold, in which different preset frame number thresholds are set for different scenario types.

Illustratively, the scenario types may be preset, which may be divided into a sports scenario, a study scenario, a dance scenario, a video communication scenario, or the like. For different scenario types, different preset frame number thresholds may be set, such as 10 frames in the case of the study scenario and 3 frames in the case of the sports scenario as illustrated above.

In the process of determining the scenario type of the live streaming scenario corresponding to the video frame image, in one possible case, the scenario type may be determined directly based on a partition corresponding to the live streaming or the name of the live streaming, labels, and the like. In another possible case, considering that there may be a variety of different sessions in the live streaming, for example, there is also a video communication session in which the target object is sitting in the sports live streaming, the refinement of the scenario type in different time periods may also be performed for the live streaming itself.

For example, in the process of determining the scenario type of the live streaming scenario corresponding to the video frame image, behavior recognition may be performed on the target object in the video frame image, to determine the scenario type of the live streaming scenario corresponding to the video frame image based on a behavior recognition result of the target object.

In this way, during an actual live streaming process, the scenario types in different time periods may be further determined based on actual behaviors of the target object in different time periods. In the process of determining the preset frame number threshold using the changed scenario types, the preset frame number threshold changes accordingly. Illustratively, in the above example, in response to that a change in scenario type from a sports type to a video communication type is detected during the live streaming, the preset frame number threshold will dynamically change to increase, for example, from 3 frames determined in the sports type to 10 frames in the video communication type.

In another possible case, the scenario type may also be determined according to the model type corresponding to the prediction model that performs the interpolation prediction on the video frame image. Because the prediction model may be expressed in different functional forms in implementations, such different functional form expressions may also illustrate different motion change characteristics of the target object. For example, the functional forms in prediction models corresponding to the static video communication scenario and the study scenario illustrated in the above examples will be different from the functional forms in the dynamic dance scenario and the video communication scenario illustrated in the above examples, and therefore, the model type corresponding to the prediction model may be used as a basis for distinguishing the scenario type.

In addition, for different prediction models, due to the different functional forms, the increments obtained under different prediction models are different at the same sampling time interval of the video frame image after new video frame images are acquired consecutively. For example, for a prediction model in the form of exponential function, the increment will be greater than that corresponding to a prediction model under the linear function. The increment will determine an offset of the position information obtained in the currently acquired video frame image from the historical position information in the previous frame of historical frame image. It is also more appropriate to set a smaller preset frame number threshold to make correction in time to the prediction model, in response to that there is a large offset of position information in the plurality of frames of video frame images.

According to the above description, in the process of acquiring the position information corresponding to the target object in the video frame image in the embodiments of the present disclosure, the video frame image may be processed by the interpolation prediction or object recognition. The process is described below by way of an example.

First, a live streaming starts with two live streaming users therein. In the course of the live streaming, either of the live streaming users selects to add a head effect for one of the specified live streaming users, then after the operation is confirmed, the newly acquired video frame image is taken as a video frame image to be processed, and the specified live streaming user is taken as a target object for which position information is to be determined in the video frame image.

For the acquired first frame of video frame image to be processed, considering that there is currently no reference data that can be referred to for determining the prediction model, object recognition may be preferred for use to determine the position information from the video frame image. The position information obtained may be stored for use in determining the position information for the subsequently acquired video frame image.

Then, the acquisition of a second frame of video frame image is continued. For the second frame of video frame image, it may be determined first whether it satisfies the preset verification condition. Illustratively, in response to determining that the scenario type of the live streaming scenario is a study type according to label information marked at the time of posting the live streaming, or by behavior recognition for a period of time, the corresponding preset frame number threshold is 10 frames. Therefore, for the acquired second frame of video frame image, the position information may be determined using a prediction model.

Here, in the process of determining the prediction model, the model type may be determined according to the scenario type. After the model type is determined, the acquired first frame of video frame image to be processed illustrated above is used to adjust parameters of the prediction model in the model type, to obtain the prediction model in application. Then, the second frame of video frame image is subjected to the interpolation prediction using the prediction model, to obtain the position information corresponding to the second frame of video frame image.

For the subsequent video frame images from the third frame to the eleventh frame, because none of them satisfy the preset verification condition, all of them may be subjected to the interpolation prediction using the prediction model determined above, to obtain the corresponding position information.

In response to determining that the twelfth frame of video frame image is acquired, because the interval between the twelfth frame of video frame image and the first frame of video frame image in which the object recognition is used the last time is more than 10 frames, the object recognition may be used again to determine the position information of the target object in the video frame image. The accurate result of position information obtained by the object recognition herein is continued to be used for correcting the parameters in the prediction model, so that more accurate result may be obtained for the video frame image obtained thereafter by the corrected prediction model.

In a process of processing the video frame image in a similar manner as described above, in response to determining that a change in scenario type of the live streaming scenario is detected, such as a change from a study type to a sports type, a different prediction model may be selected and the matching preset frame number threshold is changed accordingly.

In this way, during the live streaming process, the computing power and time consumed in using of the object recognition may be reduced by using of the interpolation prediction, with the efficiency increased, thereby meeting the actual needs in the live streaming scenario. In addition, by using the object recognition alternatively, the accurate position information may be obtained once after an interval of a certain number of frames, which can be used for adjusting parameters of the prediction model used in subsequence, and also enables the corrected prediction model to continue to make more accurate prediction.

The position information of the target object determined above may further be used to determine a display position corresponding to a target effect matching the target object.

Here, in one possible case, the position information may be directly used as the display position corresponding to the target effect. For example, in response to determining that the target effect is to be displayed on the head of a live streaming user and the selected target object is the user's head, there is no need to process the position information, and the target effect may be displayed in a position area expressed by the determined position information.

In another possible case, in response to determining that the target object includes a human or an animal as a whole, and the determined target effect is matched with a certain part, such as the head in the above example, then the position where the specific part, such as the head, is located may also be further determined based on the position information of the target object, to obtain the display position corresponding to the target effect.

In yet another possible case, the target effect may not be attached to the target object for superimposed display, for example, a fluorescent effect is displayed around the side of the target object. In this case, after the position information of the target object is determined, the display position of the target effect may be determined according to a display form corresponding to the target effect associated with the display, and an offset between the display position of the target effect and the position information that may be determined.

In another embodiment of the present disclosure, according to the above description, the effects that may be selected are diverse. In the process of determining the target effect matching the target object, in one possible case, the target effect selected by the user for display may be determined from a plurality of effects displayed to the user in response to a selection operation of the user. Here, because there may be a plurality of target objects in the video frame image, the user may select different target effects to match different target objects.

In another possible case, it is also possible to match corresponding target effects to the respective target objects on the basis of object attributes of the respective target objects. In response to the scenario types of the live streaming scenario being different, the corresponding target effects under different object attributes are different. For example, the object attributes may include gender. In the study scenario, school uniform shirt effects are matched for boys while school uniform skirt effects are matched for girls. In the dance scenario, necklace jewelry effects are matched for boys, while hair accessories effects are matched for girls, and the like.

Here, in a live streaming, according to the above description of the scenario types, different scenario types may be determined in different time periods in the live streaming, and the target effects matched with the same target object may be changed in different scenario types. According to the above description, the scenario type may be determined according to the behavior recognition result or model type, so when the user's behavior changes, it may be changed to match to a different effect. For example, in response to the target object being a pet, the effect of a butterfly resting on the body displayed on the pet when it sits still may be changed to the effect of dazzling colorful light displayed on the pet when it runs. In this way, the effects can be changed according to actual movements of the target object, which is more flexible and interesting.

With respect to the above S103, in the above step, the target effect is matched to the target object in the live streaming and the display position corresponding to the target effect is determined, that is, the target effect matching each target object may be displayed at the display position in the video frame image. In the process of displaying the target effect, the target effect may be displayed in a two-dimensional form or dynamically displayed in a three-dimensional form, thereby presenting a positional relationship with the target object.

Figure 2A:
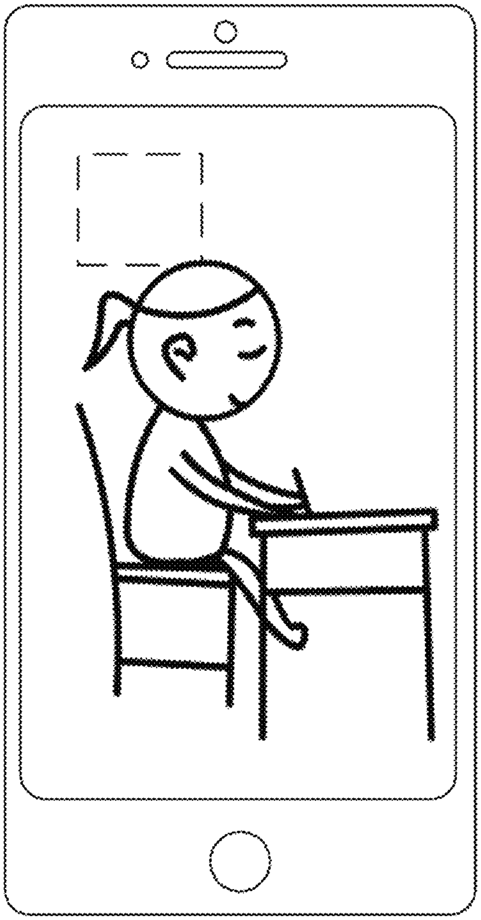
FIGS. 2A and 2B illustrate a schematic diagram of displaying an effect in a video frame image according to the embodiments of the present disclosure.
Figure 2B:
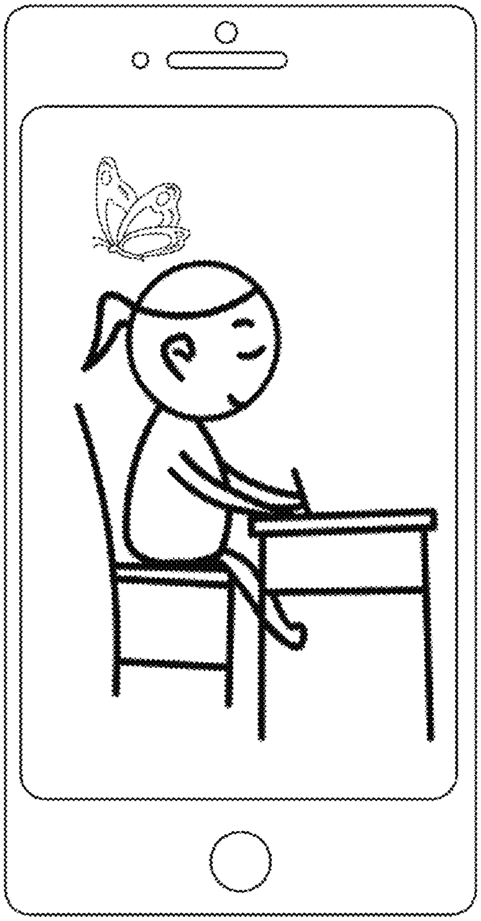

Illustratively, FIG. 2 is a schematic diagram of displaying an effect in a video frame image according to the embodiments of the present disclosure. The left (a) in FIG. 2 illustrates a video frame image to be processed. By the above steps, the display position corresponding to the target effect may be determined, which is indicated in the video frame image by a dashed box. In the process of displaying the target effect, the left (a) in FIG. 2 is changed to the form of the right (b) in FIG. 2. The selected target effect is a butterfly style effect, and is displayed at the determined display position, so that the effect of a butterfly resting on the target object is illustrated.

In another embodiment of the present disclosure, the video frame image may further include a lost frame image detected during the live streaming. For example, there may be cases of lost video frame images during the live streaming due to network and other problems, resulting in a black screen due to the lost video frame images during the live streaming or the live recording.

In this case, for the lost frame image, it is possible to acquire a live streaming background image displayed in the video frame image from the plurality of frames of historical frame images of the video frame image; and crop, based on the position information determined for the target object, an object map corresponding to the target object from a previous frame of historical frame image of the video frame image, and synthesize, based on the determined position information, the object map into the live streaming background image to obtain a completed lost frame image.

For example, in the process of live streaming by a user, the following scenarios exist: the user broadcasts a live streaming by fixing a camera device such as a cell phone in order to capture a fixed scenario background, and performs a live streaming of sports, dance, and the like in the scenario. Therefore, during the live streaming, a live streaming background image showing the scenario background may be obtained from video frame images obtained by continuous capturing. Here, because the user broadcasts the live streaming at a fixed position, the obtained live streaming background image may be used to complement the lost frame image.

As for the lost frame image, in addition to showing the scenario background, the position in which the target object is predicted to be located in the lost frame image may be determined by the way of determining the position information corresponding to the target object as illustrated in the above steps. In the process of selecting an image corresponding to the target object superimposed under the determined position information, because an interval between consecutive video frame images is small, the action of the target object or the like will not change a lot, and therefore an object map corresponding to the target object obtained by cropping in a previous frame of historical frame image of the lost frame image may be selected as a map complemented under the position information in the live streaming background image.

In this way, it is possible to display the live streaming background image in the lost frame image and complete the object map on it to synthesize the video frame image that can be used for display. Because both the live streaming background image and the object map are acquired from the historical frame images, the completed lost frame image is closer to other images acquired in the live streaming, and is more coherent when displayed. Because the possible movement of the target object is also considered, the display position of the object map is re-determined, so that the screen display logic is more in line with reality in the continuous displaying of the live video that includes the lost frame image.

Those skilled in the art may understand that, in the implementation of the above-mentioned methods, the writing order of the steps does not imply a strict order of execution and does not constitute any limitation of the implementation process, and the execution order of the steps should be determined by its function and possible internal logic.

Based on the same inventive concept, the embodiments of the present disclosure further provide an effect display apparatus corresponding to the effect display method. Because the apparatus in the embodiments of the present disclosure solves the problem in a similar way to the effect display method in the embodiments of the present disclosure, the implementation of the apparatus may refer to the implementation of the method, and repeated descriptions are omitted.

Figure 3:
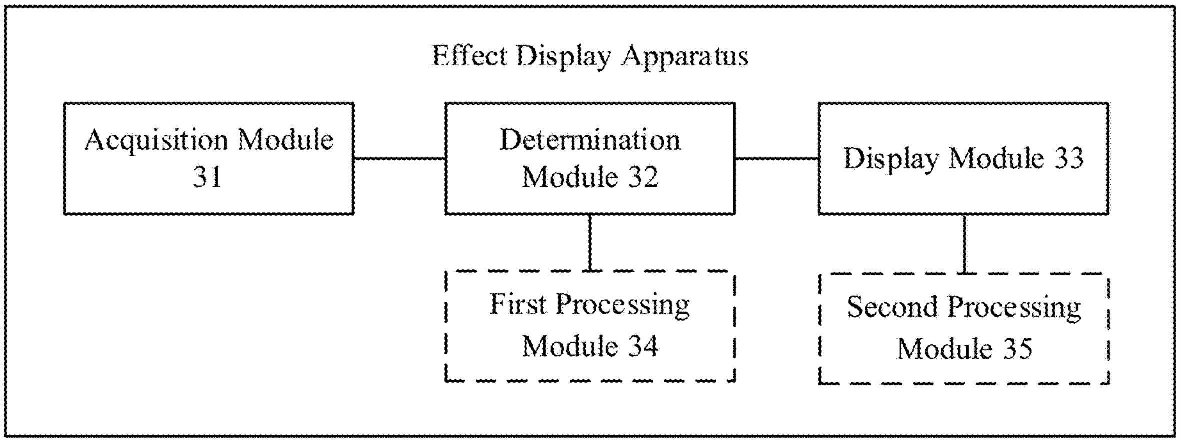
FIG. 3 illustrates a schematic diagram of an effect display apparatus according to the embodiments of the present disclosure.

FIG. 3 is a schematic diagram of an effect display apparatus according to the embodiments of the present disclosure. The apparatus includes an acquisition module 31, a determination module 32, and a display module 33.

The acquisition module 31 is configured to acquire a video frame image to be processed, and the video frame image includes an image including at least one target object acquired during live streaming.

The determination module 32 is configured to determine, based on position information corresponding to the target object in the video frame image, a display position corresponding to a target effect matching the target object; and the position information corresponding to the target object in the video frame image is determined based on historical position information corresponding to the target object in a plurality of frames of historical frame images.

The display module 33 is configured to display, based on the display position, the target effect matching each target object in the video frame image.

In an optional embodiment, determining the position information corresponding to the target object in the video frame image includes: determining whether the video frame image satisfies a preset verification condition based on the historical position information determined for the target object consecutively over several times; in response to the video frame image not satisfying the preset verification condition, performing interpolation prediction on the video frame image using a prediction model to obtain the position information corresponding to the target object in the video frame image, in which the prediction model is obtained by fitting based on the historical position information determined consecutively; and in response to the video frame image satisfying the preset verification condition, performing object recognition on the video frame image to obtain the position information corresponding to the target object in the video frame image.

In an optional embodiment, determining whether the video frame image satisfies the preset verification condition includes: determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

In an optional embodiment, determining the preset frame number threshold includes: determining a scenario type of a live streaming scenario corresponding to the video frame image; and determining, based on the scenario type of the live streaming scenario, the preset frame number threshold, in which different preset frame number thresholds are set for different scenario types.

In an optional embodiment, the effect display apparatus further includes a first processing module 34, which is configured to determine the scenario type of the live streaming scenario corresponding to the video frame image, and is specifically configured to perform at least one of: (i) performing behavior recognition on the target object in the video frame image to determine the scenario type of the live streaming scenario corresponding to the video frame image, based on a behavior recognition result of the target object; (ii) determining a model type corresponding to the prediction model used for the interpolation prediction on the video frame image, and determining the scenario type of the live streaming scenario corresponding to the video frame image based on the model type.

In an optional embodiment, the video frame image further includes a lost frame image detected during the live streaming, and the effect display apparatus further includes a second processing module 35, which is configured to: acquire a live streaming background image displayed in the video frame image from the plurality of frames of historical frame images of the video frame image; and crop, based on the position information determined for the target object, an object map corresponding to the target object from a previous frame of historical frame image of the video frame image, and synthesize, based on the determined position information, the object map into the live streaming background image to obtain a completed lost frame image.

The descriptions of processing flows of the modules and the interaction flows between the modules in the apparatus may be referred to the relevant descriptions in the above-mentioned method embodiments, and will not be described in detail herein.

Figure 4:
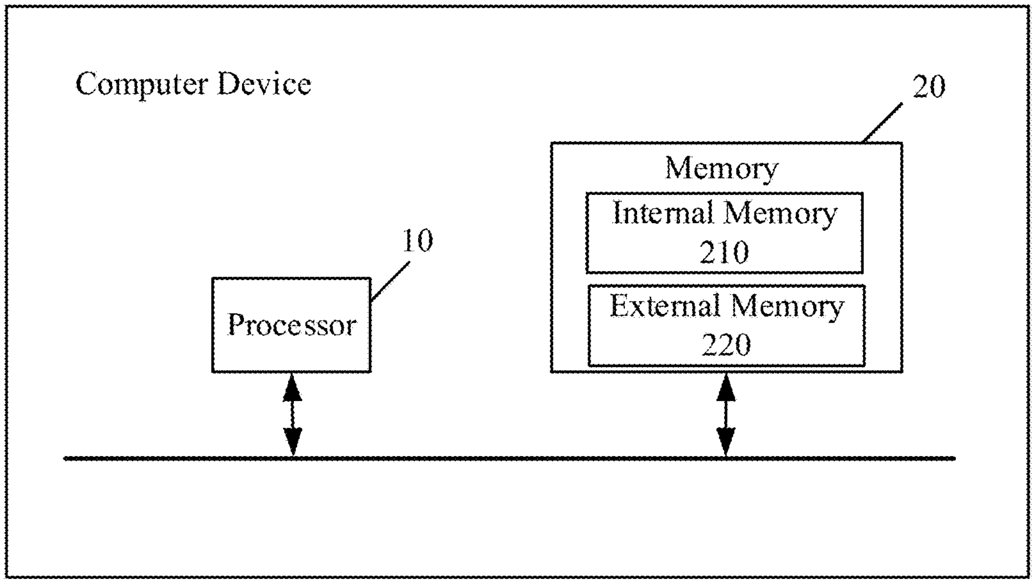
FIG. 4 illustrates a schematic diagram of a computer device according to the embodiments of the present disclosure.

The embodiments of the present disclosure further provide a computer device. FIG. 4 is a schematic structural diagram of a computer device according to the embodiments of the present disclosure. The computer device includes a processor 10 and a memory 20; the memory 20 stores machine-readable instructions executable by the processor 10, the processor 10 is configured to execute the machine-readable instructions stored in the memory 20, and when the machine-readable instructions are executed by the processor 10, the processor 10 performs the following steps:

acquiring a video frame image to be processed, in which the video frame image includes an image including at least one target object acquired during live streaming; determining, based on position information corresponding to the target object in the video frame image, a display position corresponding to a target effect matching the target object, in which the position information corresponding to the target object in the video frame image is determined based on historical position information corresponding to the target object in a plurality of frames of historical frame images; and displaying, based on the display position, the target effect matching each target object in the video frame image.

The above-mentioned memory 20 includes an internal memory 210 and an external memory 220. The internal memory 210, also referred to as an internal storage, is used for temporary storage of computing data in the processor 10, as well as data exchanged with the external memory 220, such as a hard disk. The processor 10 exchanges data with the external memory 220 through the internal memory 210.

The specific execution process of the above-mentioned instructions may be referred to the steps of the effect display method described in the embodiments of the present disclosure, and will not be repeated herein.

The embodiments of the present disclosure further provide a computer-readable storage medium, and the computer-readable storage medium stores a computer program. When the computer program is run by a processor, the effect display method described in the method embodiments above are performed. The storage medium may be a volatile or non-volatile computer-readable storage medium.

The present disclosure further provides a computer program product, which carries program code, the instructions included in the program code being used to execute the steps of the effect display method as described in the method embodiments mentioned above. For specific details, reference may be made to the method embodiments mentioned above, and thus will not be repeated herein.

The computer program product may be implemented specifically by means of hardware, software or a combination thereof. In an optional embodiment, the computer program product is specifically embodied as a computer storage medium, and in another optional embodiment, the computer program product is specifically embodied as a software product, such as an SDK (Software Development Kit), and the like.

It may be clearly understood by those skilled in the art that, for the purpose of convenient and brief description, for a detailed working process of the foregoing system and apparatus, reference may be made to a corresponding process in the foregoing method embodiments, and details are not described again herein. In some embodiments provided by the present disclosure, it should be understood that the disclosed system, apparatus, and method may be implemented in other modes. For example, the apparatus embodiments as described above are only schematic, for example, the division of the units may be logical functional division; in actual implementation, there may be other division modes; for another example, a plurality of units or components may be combined or integrated into another system, or some features may be ignored or not executed. On the other hand, the displayed or discussed mutual coupling or direct coupling or communication connection may be implemented by using some communication interfaces. The indirect coupling or communication connection between the apparatuses or units may be implemented in electronic, mechanical, or other forms.

The above-mentioned units illustrated as separate components may be, or may not be physically separated, and the components displayed as units may be, or may not be, physical units, that is, they may be at one place, or may also be distributed to a plurality of network units; and some or all of the units may be selected according to actual needs to achieve the purpose of the solutions of the present embodiment.

In addition, the respective functional units in the respective embodiments of the present disclosure may be integrated in one processing unit, or each unit may physically exist separately, or two or more units may be integrated in one unit.

In the case where the functions are implemented in a form of software functional unit and sold or used as an independent product, the functions may be stored in a non-volatile computer-readable storage medium executable to the processor. Based on such understanding, the technical solutions of the present disclosure essentially, or part of the technical solutions may be implemented in a form of a software product. The computer software product is stored in a storage medium and includes several instructions so that a computer device (which may be a personal computer, a server, or a network device, etc.) to execute all or part of steps of the methods according to the respective embodiments of the present disclosure. The foregoing storage medium includes a USB flash disk, a removable hard disk, a Read-Only Memory (ROM), a Random-Access Memory (RAM), a magnetic disk or an optical disk, and various other media that can store program code.

Finally, it should be noted that the above-mentioned embodiments are only specific implementations of the present disclosure and used to illustrate the technical solutions of the present disclosure, and are not intended to limit the present disclosure; and the protection scope of the present disclosure is not limited thereto; although the present disclosure has been described in detail with reference to the foregoing embodiments, those ordinarily skilled in the art should understand that within the technical scope disclosed in the present disclosure, any person of skill familiar with the technical field can still modify or conceive of changes to the technical solutions recorded in the foregoing embodiments, or make equivalent substitutions for some of the technical features therein; and these modifications, changes or substitutions do not cause the essence of the corresponding technical solutions to deviate from the spirit and scope of the technical solutions of the embodiments of the present disclosure, all of which shall be covered within the protection scope of the present disclosure. Therefore, the protection scope of the present disclosure shall be subject to the protection scope of the claims.

The invention claimed is:

1. An effect display method, comprising:

acquiring a video frame image to be processed, wherein the video frame image comprises an image comprising at least one target object acquired during live streaming;

determining, based on position information corresponding to the target object in the video frame image, a display position corresponding to a target effect matching the target object, wherein the position information corresponding to the target object in the video frame image is determined based on historical position information corresponding to the target object in a plurality of frames of historical frame images; and displaying, based on the display position, the target effect matching each target object in the video frame image, wherein determining the position information corresponding to the target object in the video frame image comprises:

determining whether the video frame image satisfies a preset verification condition based on the historical position information determined for the target object consecutively over several times, in response to the video frame image not satisfying the preset verification condition, performing interpolation prediction on the video frame image using a prediction model to obtain the position information corresponding to the target object in the video frame image, wherein the prediction model is obtained by fitting based on the historical position information determined consecutively, and in response to the video frame image satisfying the preset verification condition, performing object recognition on the video frame image to obtain the position information corresponding to the target object in the video frame image.

2. The method according to claim 1, wherein determining whether the video frame image satisfies the preset verification condition comprises:

determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

3. The method according to claim 2, wherein determining the preset frame number threshold comprises:

determining a scenario type of a live streaming scenario corresponding to the video frame image; and determining, based on the scenario type of the live streaming scenario, the preset frame number threshold, wherein different preset frame number thresholds are set for different scenario types.

4. The method according to claim 3, wherein the determining the scenario type of the live streaming scenario corresponding to the video frame image comprises at least one of:

(i) performing behavior recognition on the target object in the video frame image to determine the scenario type of the live streaming scenario corresponding to the video frame image, based on a behavior recognition result of the target object;

(ii) determining a model type corresponding to the prediction model used for the interpolation prediction on the video frame image, and determining the scenario type of the live streaming scenario corresponding to the video frame image based on the model type.

5. The method according to claim 1, wherein the video frame image further comprises a lost frame image detected during the live streaming, and the method further comprises:

acquiring a live streaming background image displayed in the video frame image from the plurality of frames of historical frame images of the video frame image; and cropping, based on the position information determined for the target object, an object map corresponding to the target object from a previous frame of historical frame image of the video frame image, and synthesizing, based on the determined position information, the object map into the live streaming background image to obtain a completed lost frame image.

6. A computer device, comprising a processor and a memory, wherein the memory stores machine-readable instructions executable by the processor, the processor is configured to execute the machine-readable instructions stored in the memory, and when the machine-readable instructions are executed by the processor, the processor performs operations, the operations comprising:

acquiring a video frame image to be processed, wherein the video frame image comprises an image comprising at least one target object acquired during live streaming;

determining, based on position information corresponding to the target object in the video frame image, a display position corresponding to a target effect matching the target object, wherein the position information corresponding to the target object in the video frame image is determined based on historical position information corresponding to the target object in a plurality of frames of historical frame images; and displaying, based on the display position, the target effect matching each target object in the video frame image, wherein determining the position information corresponding to the target object in the video frame image comprises:

determining whether the video frame image satisfies a preset verification condition based on the historical position information determined for the target object consecutively over several times, in response to the video frame image not satisfying the preset verification condition, performing interpolation prediction on the video frame image using a prediction model to obtain the position information corresponding to the target object in the video frame image, wherein the prediction model is obtained by fitting based on the historical position information determined consecutively, and in response to the video frame image satisfying the preset verification condition, performing object recognition on the video frame image to obtain the position information corresponding to the target object in the video frame image.

7. The computer device according to claim 6, wherein determining whether the video frame image satisfies the preset verification condition comprises:

determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

8. The computer device according to claim 7, wherein determining the preset frame number threshold comprises:

determining a scenario type of a live streaming scenario corresponding to the video frame image; and determining, based on the scenario type of the live streaming scenario, the preset frame number threshold, wherein different preset frame number thresholds are set for different scenario types.

9. The computer device according to claim 8, wherein the determining the scenario type of the live streaming scenario corresponding to the video frame image comprises at least one of:

(i) performing behavior recognition on the target object in the video frame image to determine the scenario type of the live streaming scenario corresponding to the video frame image, based on a behavior recognition result of the target object;

(ii) determining a model type corresponding to the prediction model used for the interpolation prediction on the video frame image, and determining the scenario type of the live streaming scenario corresponding to the video frame image based on the model type.

10. The computer device according to claim 6, wherein the video frame image further comprises a lost frame image detected during the live streaming, and the operations further comprise:

acquiring a live streaming background image displayed in the video frame image from the plurality of frames of historical frame images of the video frame image; and cropping, based on the position information determined for the target object, an object map corresponding to the target object from a previous frame of historical frame image of the video frame image, and synthesizing, based on the determined position information, the object map into the live streaming background image to obtain a completed lost frame image.

11. A non-transitory computer-readable storage medium, storing a computer program, wherein when the computer program is executed by a computer device, the computer device performs operations, the operations comprising:

acquiring a video frame image to be processed, wherein the video frame image comprises an image comprising at least one target object acquired during live streaming;

determining, based on position information corresponding to the target object in the video frame image, a display position corresponding to a target effect matching the target object, wherein the position information corresponding to the target object in the video frame image is determined based on historical position information corresponding to the target object in a plurality of frames of historical frame images; and displaying, based on the display position, the target effect matching each target object in the video frame image, wherein determining the position information corresponding to the target object in the video frame image comprises:

determining whether the video frame image satisfies a preset verification condition based on the historical position information determined for the target object consecutively over several times, in response to the video frame image not satisfying the preset verification condition, performing interpolation prediction on the video frame image using a prediction model to obtain the position information corresponding to the target object in the video frame image, wherein the prediction model is obtained by fitting based on the historical position information determined consecutively, and in response to the video frame image satisfying the preset verification condition, performing object recognition on the video frame image to obtain the position information corresponding to the target object in the video frame image.

12. The non-transitory computer-readable storage medium according to claim 11, wherein determining whether the video frame image satisfies the preset verification condition comprises:

determining a target historical frame image for which historical position information is determined by the object recognition the last time, among the plurality of frames of historical frame images obtained before acquiring the video frame image; and in response to an interval frame number between the target historical frame image and the video frame image exceeding a preset frame number threshold, determining that the video frame image satisfies the preset verification condition.

13. The non-transitory computer-readable storage medium according to claim 12, wherein determining the preset frame number threshold comprises:

determining a scenario type of a live streaming scenario corresponding to the video frame image; and determining, based on the scenario type of the live streaming scenario, the preset frame number threshold, wherein different preset frame number thresholds are set for different scenario types.

14. The non-transitory computer-readable storage medium according to claim 13, wherein the determining the scenario type of the live streaming scenario corresponding to the video frame image comprises at least one of:

(i) performing behavior recognition on the target object in the video frame image to determine the scenario type of the live streaming scenario corresponding to the video frame image, based on a behavior recognition result of the target object;

(ii) determining a model type corresponding to the prediction model used for the interpolation prediction on the video frame image, and determining the scenario type of the live streaming scenario corresponding to the video frame image based on the model type.

15. The non-transitory computer-readable storage medium according to claim 1, wherein the video frame image further comprises a lost frame image detected during the live streaming, and the operations further comprise:

acquiring a live streaming background image displayed in the video frame image from the plurality of frames of historical frame images of the video frame image; and cropping, based on the position information determined for the target object, an object map corresponding to the target object from a previous frame of historical frame image of the video frame image, and synthesizing, based on the determined position information, the object map into the live streaming background image to obtain a completed lost frame image.

* * * * *